(12) United States Patent
Urushihara et al.

(10) Patent No.: US 8,420,721 B2
(45) Date of Patent: Apr. 16, 2013

(54) POLYOLEFIN RESIN COMPOSITION

(75) Inventors: Tsuyoshi Urushihara, Saitama (JP); Naoto Ueda, Saitama (JP); Naoshi Kawamoto, Saitama (JP)

(73) Assignee: Adeka Corporation, Tokyo (JP)

( * ) Notice: Subject to any disclaimer, the term of this patent is extended or adjusted under 35 U.S.C. 154(b) by 358 days.

(21) Appl. No.: 12/680,398

(22) PCT Filed: Aug. 29, 2008

(86) PCT No.: PCT/JP2008/065550
§ 371 (c)(1),
(2), (4) Date: Mar. 26, 2010

(87) PCT Pub. No.: WO2009/041213
PCT Pub. Date: Apr. 2, 2009

(65) Prior Publication Data
US 2010/0240815 A1    Sep. 23, 2010

(30) Foreign Application Priority Data
Sep. 28, 2007    (JP) .................................. 2007-254243

(51) Int. Cl.
*C08K 5/20*    (2006.01)
*C08L 23/00*    (2006.01)

(52) U.S. Cl.
USPC ........................... 524/226; 524/229; 524/570

(58) Field of Classification Search .................. 524/226, 524/224, 227, 228, 186, 178; *C08K 5/20*
See application file for complete search history.

(56) References Cited

U.S. PATENT DOCUMENTS

| 5,973,076 A | 10/1999 | Yoshimura et al. |
| 6,235,823 B1 | 5/2001 | Ikeda et al. |

FOREIGN PATENT DOCUMENTS

| JP | 50-105558 | | 8/1975 |
| JP | 51-114482 | | 10/1976 |
| JP | 63308068 A | * | 12/1988 |
| JP | 5-310665 A | | 11/1993 |
| JP | 6-107875 A | | 4/1994 |
| JP | 6-220269 A | | 8/1994 |
| JP | 6-234890 A | | 8/1994 |
| JP | 6-263969 A | | 9/1994 |
| JP | 6-271762 A | | 9/1994 |
| JP | 8-48838 A | | 2/1996 |
| JP | 8-157640 A | | 6/1996 |
| JP | 08302331 A | * | 11/1996 |
| JP | 08302331 A | * | 11/1996 |

OTHER PUBLICATIONS

Libster et al., "Advanced nucleating agents for polypropylene," Polymers for Advanced Technologies, vol. 18, No. 9 (Aug. 13, 2007), pp. 685-695.*

Mohmeyer et al., "Influence of Chemical Structure and Solubility of Bisamide Additives on the Nucleation of Isotactic Polypropylene and the Improvement of Its Charge Storage Properties," Macromolecules, vol. 39, No. 17 (Jul. 20, 2006), pp. 5760-5767.*

JP 08-302331A Machine Translation, JPO Advanced Industrial Property Network (AIPN), Nov. 1996.*

JP 08-302331A (1996), machine translation, JPO Advanced Industrial Property Network (AIPN).*

* cited by examiner

*Primary Examiner* — David W Wu
*Assistant Examiner* — Josephine Chang
(74) *Attorney, Agent, or Firm* — Birch, Stewart, Kolasch & Birch, LLP.

(57) ABSTRACT

A polyolefin resin composition having a high crystallization temperature and excellent transparency is provided. The polyolefin resin composition comprises 0.01 to 10 parts by mass of a methylenebisanilide compound with respect to 100 parts by mass of a polyolefin resin, wherein the methylenebisanilide compound is represented by General Formula 1, wherein each of $X^1, X^2, X^3, X^4, X^5, X^6, X^7$ and $X^8$ independently represents a hydrogen atom or $C_1$-$C_{10}$ alkyl which is optionally substituted or branched; and each of $R^1$ and $R^2$ independently represents a hydrogen atom, $C_1$-$C_{21}$ alkyl which is optionally substituted or branched, $C_3$-$C_{12}$ cycloalkyl which is optionally substituted, or $C_6$-$C_{20}$ aryl which is optionally substituted.

5 Claims, No Drawings

POLYOLEFIN RESIN COMPOSITION

TECHNICAL FIELD

The present invention relates to a polyolefin resin composition, more particularly, a polyolefin resin composition produced by improvement of a crystalline nucleating agent to be added.

BACKGROUND ART

Polyolefin resins have advantages in their excellent moldability, heat resistance, mechanical properties and low specific gravities, and have been widely used for films, sheets and various molded articles (e.g., structural parts). However, transparencies of polyolefin resins have not been always good.

This drawback is due to crystallinity of polyolefin resins, so that various crystalline nucleating agents have been widely used to improve transparency of polyolefin resins and to add heat resistance and mechanical strength thereto. Examples of such crystalline nucleating agent include compounds such as metal salts of carboxylic acids such as sodium benzoate, aluminum 4-tert-butylbenzoate, sodium adipate and disodium bicyclo[2.2.1]heptane-2,3-dicarboxylate; metal salts of phosphates such as sodium bis(4-tert-butylphenyl)phosphate, sodium 2,2'-methylenebis(4,6-di-tert-butylphenyl) phosphate and lithium 2,2'-methylenebis(4,6-di-tert-butylphenyl)phosphate; and derivatives of polyols such as dibenzylidene sorbitol, bis(methylbenzylidene)sorbitol and bis(dimethylbenzylidene)sorbitol.

Addition of amide compounds to improve properties of polyolefin resins such as polyethylene, polypropylene, polybutene-1 and 1,2-polybutadiene is widely known, for example as described in Patent Documents 1 to 9 described below.

In Patent Document 1, blending of a fatty acid diamide compound of phenylenediamine to inhibit degradation of polypropylene contacting with heavy metals such as copper is proposed, and an inhibitory effect on degradation due to a heavy metal is shown. In Patent Document 2, improvement of heat-sealing properties and transparency by blending of a bisamide compound to a polyolefin polymer containing not less than 5% by weight of polybutene-1 is disclosed. In Patent Document 3, addition of an amide compound obtained from a diamine and a monocarboxylic acid to polypropylene to obtain a crystalline polypropylene resin composition containing β crystals in a large amount is disclosed. In Patent Document 4, a compound obtained by reacting naphthalenedicarboxylic acid or biphenyldicarboxylic acid with a monoamine is proposed.

In Patent Documents 5 to 9, methods wherein a polyamine amide compound is included in polypropylene resins, polyethylene resins, polyester resins, polyamide resin, and crystalline synthetic resins called generically engineering plastics, respectively, are proposed.

Patent Document 1: Japanese Unexamined Patent Application Publication No. 50-105558
Patent Document 2: Japanese Unexamined Patent Application Publication No. 51-114482
Patent Document 3: Japanese Unexamined Patent Application Publication No. 6-107875
Patent Document 4: Japanese Unexamined Patent Application Publication No. 5-310665
Patent Document 5: Japanese Unexamined Patent Application Publication No. 6-220269
Patent Document 6: Japanese Unexamined Patent Application Publication No. 6-234890
Patent Document 7: Japanese Unexamined Patent Application Publication No. 6-263969
Patent Document 8: Japanese Unexamined Patent Application Publication No. 6-271762
Patent Document 9: Japanese Unexamined Patent Application Publication No. 8-157640

DISCLOSURE OF THE INVENTION

Problems to be Solved by the Invention

Today, however, performances demanded for polyolefin resins, especially polypropylene resins have become higher, and a crystalline nucleating agent which can attain further improvement of transparency and addition of other properties is demanded, so that those proposed conventionally are becoming insufficient.

For example, as described in Patent Document 1, addition of dicarboxylic acid of phenylenediamine to a polypropylene resin showed only a small effect as a crystalline nucleating agent and was impractical. In resin compositions described in Patent Document 2, the improvement effect on transparency was not observed in cases where N,N'-dioctadecyl-nonanediamide, which corresponds to bisamide compounds of No. 3-5 and No. 3-6 described in Table 3 on page 7 of the specification, was employed alone, so that blending of polybutene-1 was required in order to improve transparency. In crystalline polypropylene resin compositions described in Patent Document 3, since β crystals have lower melting points compared to α crystals thereby having low heat resistance and cause poor transparency of molded articles, the resin compositions were not appropriate for providing a polypropylene having both heat resistance and transparency. Further, a compound described in Patent Document 4 obtained by reacting naphthalenedicarboxylic acid or biphenyldicarboxylic acid with a monoamine was actually evaluated, and it was found that its effect on improvement of transparency is small and not satisfactory.

Further, the effects of polyamine amide compounds described in Patent Documents 5 to 9 on improvement of transparency of polyolefin resins were not satisfactory in all the cases.

It is known that processability is improved in cases where ethylenebisstearylamide is used in combination as a lubricant when an amide compound is added to a polyolefin, but the effects of improvement of transparency, heat resistance and mechanical strength of processed molded articles were not observed or very small.

Thus, the present invention aims to solve the above-described problems of conventional technologies and to provide a polyolefin resin composition having a high crystallization temperature and excellent transparency.

Means for Solving the Problems

The present inventors intensively studied for solving the above-described problems to discover that the purposes can be attained by inclusion at a predetermined amount of a specific methylenebisanilide compound in a polyolefin resin composition, thereby completing the present invention.

That is, the polyolefin resin composition of the present invention comprises 0.01 to 10 parts by mass of a methylenebisanilide compound with respect to 100 parts by mass of a polyolefin resin, which methylenebisanilide compound is represented by the following General Formula (1):

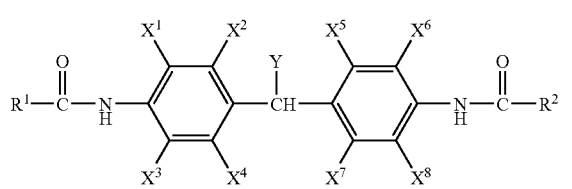

(wherein each of $X^1$, $X^2$, $X^3$, $X^4$, $X^5$, $X^6$, $X^7$ and $X^8$ independently represents a hydrogen atom or $C_1$-$C_{10}$ alkyl which is optionally substituted or branched; each of $R^1$ and $R^2$ independently represents a hydrogen atom, $C_1$-$C_{21}$ alkyl which is optionally substituted or branched, $C_3$-$C_{12}$ cycloalkyl which is optionally substituted, or $C_6$-$C_{20}$ aryl which is optionally substituted; and Y represents a hydrogen atom, $C_1$-$C_4$ alkyl which is optionally substituted or branched, $C_3$-$C_{12}$ cycloalkyl which is optionally substituted, or $C_6$-$C_{20}$ aryl which is optionally substituted).

Effect of the Invention

According to the present invention, a polyolefin resin composition which has a high crystallization temperature and excellent transparency can be provided by blending the compound represented by the General Formula (1) as a crystalline nucleating agent to a polyolefin resin.

BEST MODE FOR CARRYING OUT THE INVENTION

The polyolefin resin composition of the present invention will now be described more concretely.

Examples of the polyolefin resin used for the polyolefin resin composition of the present invention include α-olefin polymers such as low-density polyethylenes, linear low-density polyethylenes, high-density polyethylenes, isotactic polypropylenes, syndiotactic polypropylenes, hemi-isotactic polypropylenes, cycloolefin polymers, stereoblock polypropylenes, poly-3-methyl-1-butene, poly-3-methyl-1-pentene, poly-4-methyl-1-pentene; and α-olefin copolymers such as ethylene/propylene block or random copolymers.

Among the above-described polyolefin resins, polypropylene resins are preferred since they allow exertion of a remarkable effect of usage of the crystalline nucleating agent of the present invention, and polypropylene, ethylene/propylene block or random copolymers, α-olefin other than ethylene/propylene block or random copolymers, and mixtures of these propylene polymers and other α-olefin polymers are especially preferably used.

In the polyolefin resin composition of the present invention, a methylenebisanilide compound represented by the General Formula (1) below is blended as a crystalline nucleating agent to the above-mentioned polyolefin resin:

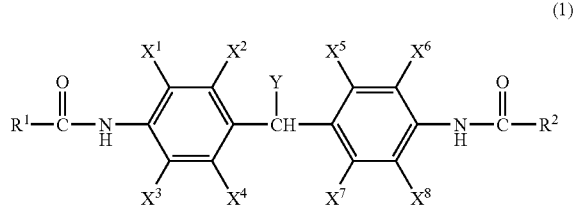

(wherein each of $X^1$, $X^2$, $X^3$, $X^4$, $X^5$, $X^6$, $X^7$ and $X^8$ independently represents a hydrogen atom or $C_1$-$C_{10}$ alkyl which is optionally substituted or branched; each of $R^1$ and $R^2$ independently represents a hydrogen atom, $C_1$-$C_{21}$ alkyl which is optionally substituted or branched, $C_3$-$C_{12}$ cycloalkyl which is optionally substituted, or $C_6$-$C_{20}$ aryl which is optionally substituted; and Y represents a hydrogen atom, $C_1$-$C_4$ alkyl which is optionally substituted or branched, $C_3$-$C_{12}$ cycloalkyl which is optionally substituted, or $C_6$-$C_{20}$ aryl which is optionally substituted).

Examples of the $C_1$-$C_{10}$ alkyl represented by $X^1$, $X^2$, $X^3$, $X^4$, $X^5$, $X^6$, $X^7$ or $X^8$ in the General Formula (1), which is optionally substituted or branched include methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, 2-ethylhexyl, nonyl, isononyl and dodecyl. Each —$CH_2$— in these alkyl is optionally substituted with —O—, —CO—, —COO— or —OCO—, and each hydrogen atom in the alkyl is optionally substituted with a halogen atom, alkenyl, alkenyloxy, alkanoyloxy, alkoxycarbonyl, nitrile or cyano.

Examples of the $C_1$-$C_{21}$ alkyl represented by $R^1$ or $R^2$ in the General Formula (1), which is optionally substituted or branched include decyl (lauryl), tridecyl, tetradecyl (myristyl), pentadecyl, hexadecyl (palmityl), heptadecyl, octadecyl (stearyl) and eicosyl, in addition to the above-described alkyl. Each —$CH_2$— in these alkyl is optionally substituted with —O—, —CO—, —COO— or —OCO—, and each hydrogen atom in the alkyl is optionally substituted with a halogen atom, alkenyl, alkenyloxy, alkanoyloxy, alkoxycarbonyl, nitrile or cyano.

Examples of the $C_3$-$C_{12}$ cycloalkyl represented by $R^1$ or $R^2$ in the General Formula (1), which is optionally substituted include saturated carbon rings such as cyclopropyl, cyclopentyl, cyclohexyl, cycloheptyl, cyclooctyl, cyclononyl and cyclodecyl, and each hydrogen atom in the saturated carbon ring is optionally substituted with a halogen atom, alkyl, alkoxy, alkenyl, alkenyloxy, alkoxyalkyl, alkanoyloxy, alkoxycarbonyl, nitrile or cyano.

Examples of the $C_6$-$C_{20}$ aryl represented by $R^1$ or $R^2$ in the General Formula (1), which is optionally substituted include aromatic rings such as phenyl, 3,4,5-trimethoxyphenyl, 4-tert-butylphenyl, biphenyl, naphthyl, anthracene and phenanthrene, and each hydrogen atom in the aromatic ring is optionally substituted with a halogen atom, alkyl, alkoxy, alkenyl, alkenyloxy, alkoxyalkyl, alkanoyloxy, alkoxycarbonyl, nitrile or cyano.

Examples of the $C_1$-$C_4$ alkyl represented by Y in the General Formula (1), which is optionally substituted or branched include $C_1$-$C_4$ alkyl among the above-mentioned alkyl, and examples of the $C_3$-$C_{12}$ cycloalkyl which is optionally substituted and the $C_6$-$C_{20}$ aryl which is optionally substituted include the same groups as those mentioned above.

Examples of the specific structure of the compound represented by the General Formula (1) in the present invention include the Compounds No. 1 to No. 31 below. It should be noted, however, that the present invention is not limited by the compounds below.

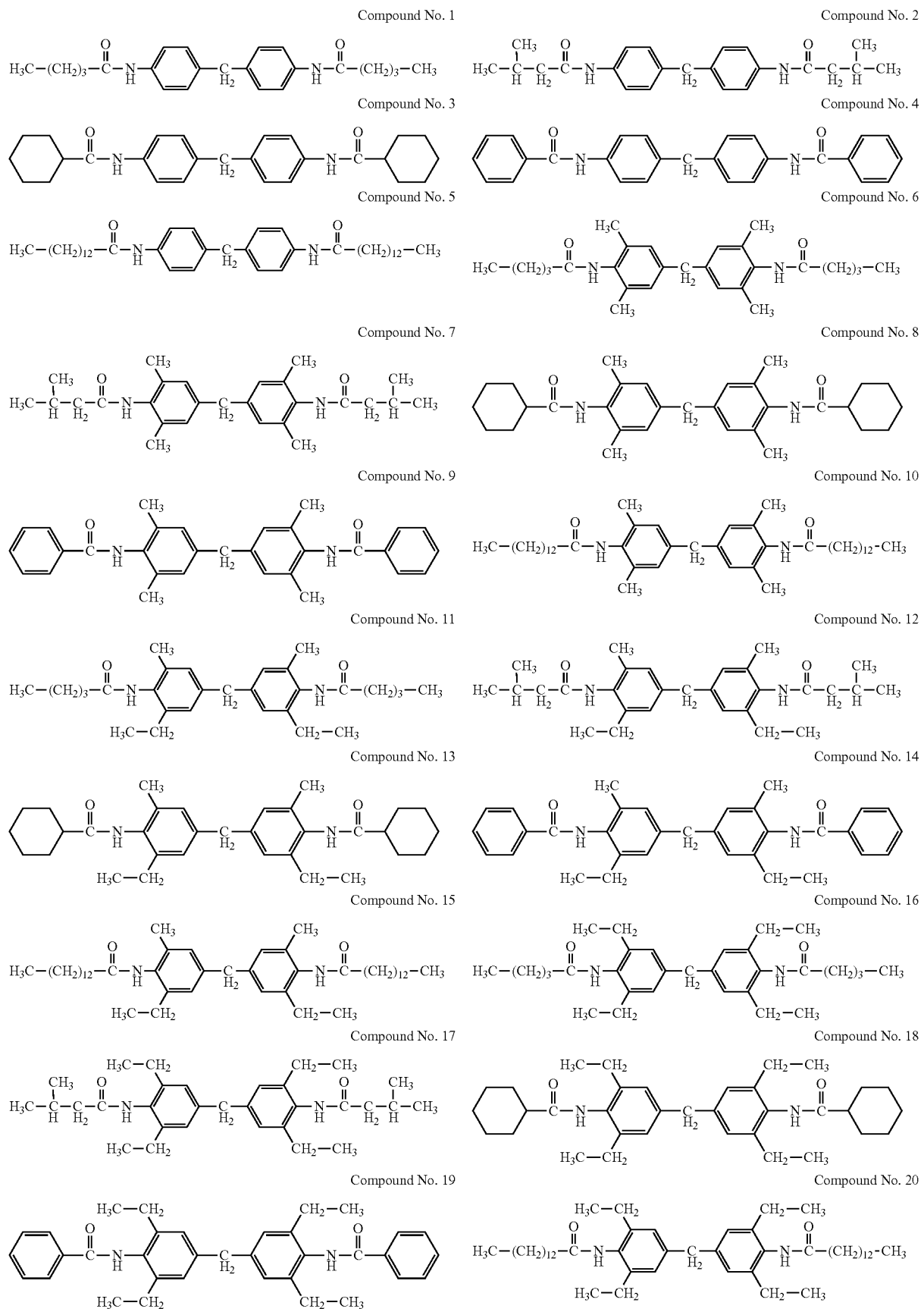

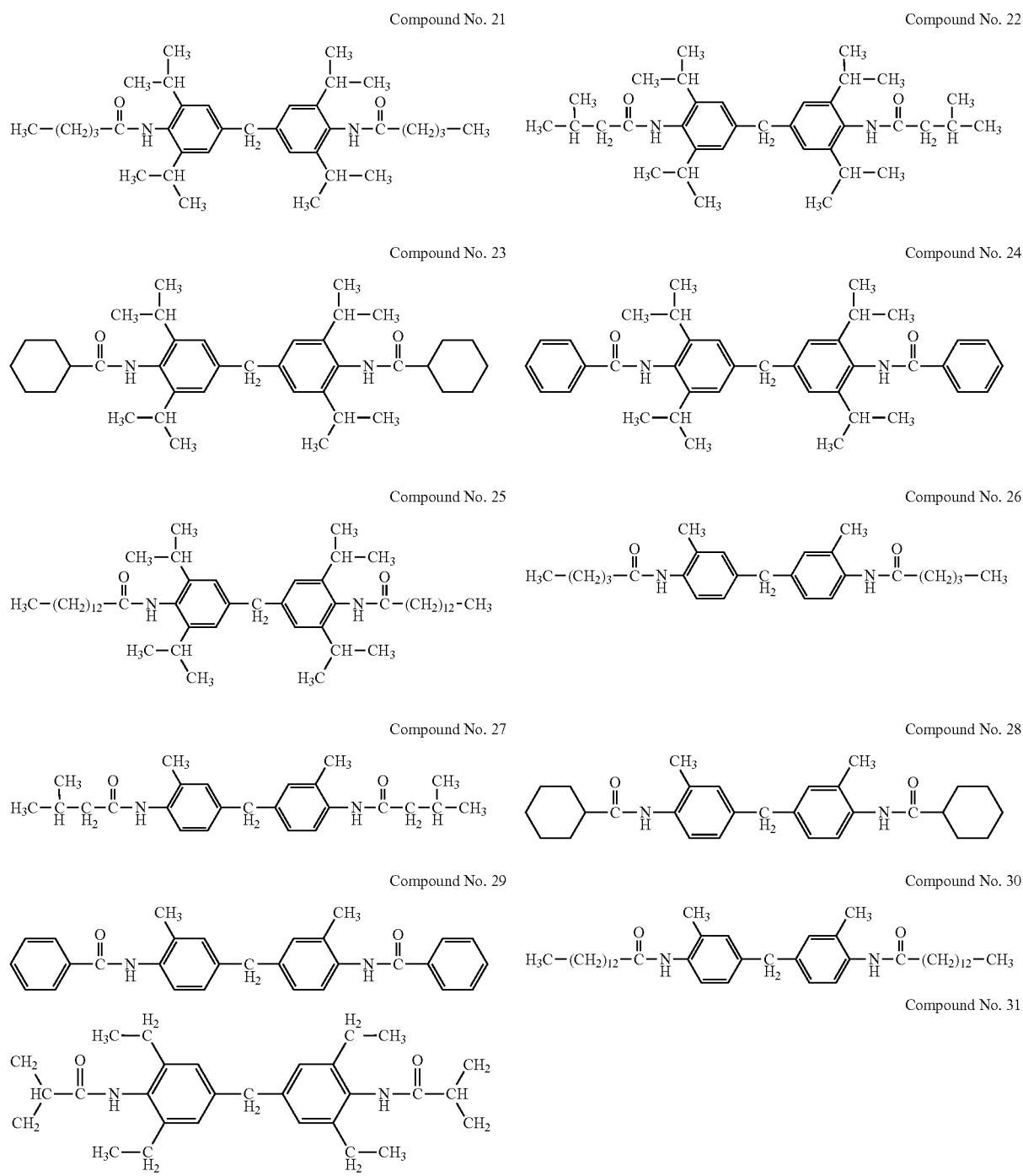

Among the methylenebisanilide compounds of the present invention, those wherein, in the General Formula (1), each of $R^1$ and $R^2$ is cyclohexyl, each of $X^1$, $X^3$, $X^6$ and $X^8$ is ethyl and each of $X^2$, $X^4$, $X^5$ and $X^7$ is a hydrogen atom are preferred since they are especially excellent in transparency, and specific examples thereof include the above-described Compound No. 18.

Further, among the methylenebisanilide compounds of the present invention, those wherein, in the General Formula (1), each of $R^1$ and $R^2$ is isopropyl or isobutyl, each of $X^1$, $X^3$, $X^6$ and $X^8$ is ethyl and each of $X^2$, $X^4$, $X^5$ and $X^7$ is a hydrogen atom are preferred since they are especially excellent in transparency, and specific examples thereof include the above-described Compounds No. 17 and No. 31.

The methylenebisanilide compound represented by the General Formula (1) can be produced according to later-mentioned Synthesis Examples, and, in general, it can be produced according to the Reaction Formula (2) below. That is, it can be easily produced by reacting a diamine compound and a carboxylic acid halide in a solvent such as dimethylacetoamide as required, while heating the mixture to reflux.

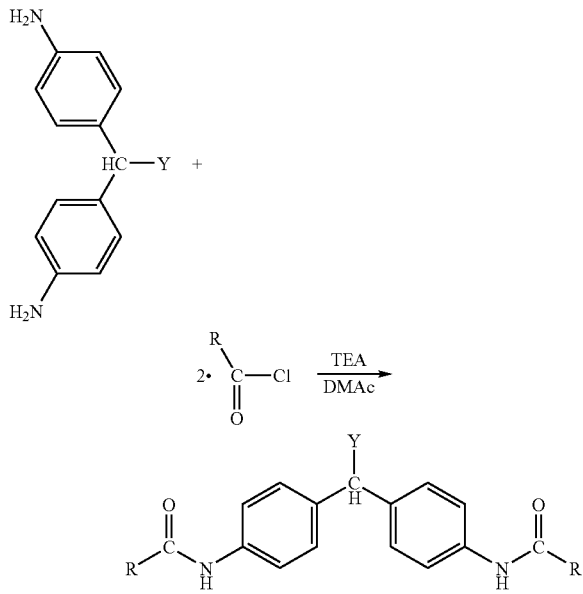

TEA: triethylamine, DMAc: dimethylacetoamide

In the polyolefin resin composition of the present invention, the methylenebisanilide compound represented by the General Formula (1) is blended at an amount of 0.01 to 10 parts by mass, preferably 0.05 to 5 parts by mass, more preferably 0.1 to 3 parts by mass with respect to 100 parts by mass of the polyolefin resin. In cases where the amount is less than 0.01 part by mass, the effect of its addition is insufficient, and in cases where the amount is more than 10 parts by mass, it may bleed to the surface of molded articles obtained by processing of the polyolefin resin composition.

To the polyolefin resin composition of the present invention, various conventionally-known additives such as plasticizers, antioxidants, heat stabilizers, light stabilizers, ultraviolet absorbers, pigments, coloring agents, various fillers, antistatic agents, mold-releasing agents, flavoring agents, lubricants, flame retardants, foaming agents, fillers, antibacterial agents, antifungal agents, crystalline nucleating agent other than compounds represented by the General Formula (1), and the like may be blended.

In the polyolefin resin composition of the present invention, the method to blend the methylenebisanilide compound represented by the General Formula (1) to the polyolefin resin is not limited, and the blending can be carried out by a conventionally known method. For example, polyolefin resin powder or pellets may be blended with additives by dry blending, or a part of the additives may be preblended to the resin followed by dry blending of the remaining components. After the dry blending, mixing may be carried out using a mill roll, Banbury mixer, Super Mixer or the like, followed by kneading using, for example, a uniaxial or biaxial extruder or the like. This mixing/kneading is carried out usually at a temperature of 120 to 220° C. Methods wherein additives are added during a polymerization step of a synthetic resin; methods wherein additives are mixed in advance at desired ratios with, for example, a granulation aid such as a binder, wax, solvent, silica or the like, followed by granulation to produce a one-pack type composite additive, which one-pack type composite additive is then added to a polyolefin resin; and methods wherein a master batch containing additives at high concentrations is prepared, which master batch is then added to a polyolefin resin; can be used.

Molding of the polyolefin resin composition of the present invention can be carried out, similarly to general plastics, by extrusion molding, injection molding, blow molding, vacuum molding, compression molding or the like, to easily obtain various molded articles such as sheets, rods, bottles and containers.

EXAMPLES

The present invention will now be described more concretely by way of Synthesis Examples, a Production Example and Examples, but the present invention is not limited by the Examples and the like below. Here, the Synthesis Examples mean methods for synthesis of methylenebisanilide compounds represented by the General Formula (1) in relation to the synthetic resin composition of the present invention, and the Production Example means an example of production of the polyolefin resin composition of the present invention. Examples mean evaluations of physical properties of the polyolefin resin composition of the present invention.

Synthesis Example 1

The Compound No. 2 was synthesized according to the following procedure.

Under a nitrogen atmosphere, 3.97 g (20 mmol) of 4,4'-methylenedianiline, 50 g of dimethylacetamide and 4.08 g (40 mmol) of triethylamine were mixed, and the mixture was stirred at room temperature. Subsequently, a mixture of 4.05 g (40 mmol) of 3-methylbutanoyl chloride and 20 g of dimethylacetamide was slowly added dropwise to the above mixture for 50 minutes. After completion of the dropping, the temperature was raised to 70° C., and the solution was stirred for 4 hours to allow the reaction. After completion of the reaction, the solvent was distilled off, and the resultant was washed by addition of distilled water and filtered, followed by drying under reduced pressure to obtain 6.6 g of white crystals (Yield: 90%). The obtained white crystals were analyzed by IR and identified as the Compound No. 2 which was the desired product. Results of these analyses are shown below.

IR [KBr tablet method] (cm$^{-1}$) 413, 509, 610, 698, 733, 772, 810, 895, 949, 988, 1119, 1173, 1200, 1234, 1258, 1312, 1373, 1408, 1466, 1535, 1597, 1655, 2870, 2955, 3044, 3117, 3186, 3294, 3449

Synthesis Example 2

The Compound No. 18 was synthesized according to the following procedure.

The synthesis was carried out according to the same procedure as in Synthesis Example 1 except that 3.97 g (20 mmol) of 4,4'-methylenedianiline was replaced with 6.21 g (20 mmol) of 4,4'-methylenebis(2,6-diethylaniline) and 4.05 g (40 mmol) of 3-methylbutaroyl chloride was replaced with 5.86 g (40 mmol) of cyclohexylcarbonylchloride, to obtain 9.8 g of white crystals (Yield: 92%). The obtained white crystals were analyzed by IR and identified as the Compound No. 18 which was the desired product. Results of these analyses are shown below.

IR [KBr tablet method] (cm$^{-1}$) 436, 683, 725, 849, 876, 957, 1061, 1130, 1196, 1219, 1254, 1335, 1385, 1450, 1516, 1605, 1647, 2855, 2928, 2966, 3260, 3422

Production Example

To 100 parts by mass of an ethylene/propylene random copolymer (ethylene content: 3% by mass, number average molecular weight: $6.5 \times 10^4$, weight average molecular weight: $3.0 \times 10^5$) whose melt flow index at 230° C. and 21.2 N was 10 g/10 minutes, 0.1 part by mass of a phenol antioxidant: tetrakis[methylene-3-(3',5'-di-tert-butyl-4'-hydroxyphenyl)propionate]methane, 0.1 part by mass of a phosphate antioxidant: tris(2,4-di-tert-butylphenyl)phosphite, 0.05 part by mass of calcium stearate and 0.1 part by mass of a compound shown in Table 1 below were mixed by Henschel mixer (FM200; manufactured by Mitsui Mining Co., Ltd.) at 1000 rpm for 1 minute, and the resulting mixture was extruded using a uniaxial extruder (OEX3024; manufactured by DDM Co., Ltd.) under processing conditions of a temperature of 240° C. and a screw speed of 30 rpm to produce pellets. The obtained pellets were dried at 70° C. for 5 hours and the following evaluations were carried out.

(Crystallization Temperature)

The temperature of the obtained pellets was raised to 300° C. at a rate of 50° C./min. using a differential scanning calorimeter (Diamond; manufactured by PerkinElmer, Inc.) and maintained for 10 minutes, and the pellets were then cooled to 100° C. at a rate of $-10°$ C./min. to calculate the exothermic peak top, which was regarded as the crystallization temperature. The results are shown in Table 1 below.

(HAZE)

Using an injection molding apparatus (EC100-2A; manufactured by TOSHIBA MACHINE CO., LTD.), the above-obtained pellets were filled into a die at an injection temperature of 230° C. and an injection pressure of 50 to 60 MPa for 40 seconds, and cooled in the die at 40° C. for 20 seconds, followed by injection molding under conditions for removal of a sheet from the die, to obtain a sheet having a square shape sizing 60 mm×60 mm with a thickness of 1 mm. Immediately after the injection molding, the sheet was left to stand in an incubator whose inner temperature was 23° C. for not less than 48 hours, and HAZE (transparency) of the test piece was calculated by Haze Guard II (manufactured by Toyo Seiki Seisaku-sho, Ltd.). The results are shown in Table 1 below.

TABLE 1

|  | Compound | HAZE [%] | Crystallization temperature [° C.] |
|---|---|---|---|
| Example 1 | Compound No. 1 | 29.7 | 107.8 |
| Example 2 | Compound No. 2 | 27.6 | 110.5 |
| Example 3 | Compound No. 3 | 31.2 | 111.7 |
| Example 4 | Compound No. 4 | 34.5 | 111.8 |
| Example 5 | Compound No. 8 | 17.8 | 101.6 |
| Example 6 | Compound No. 13 | 30.5 | 105.1 |
| Example 7 | Compound No. 16 | 18.3 | 106.5 |
| Example 8 | Compound No. 17 | 16.0 | 109.0 |
| Example 9 | Compound No. 18 | 13.5 | 110.3 |
| Example 10 | Compound No. 31 | 16.6 | 110.3 |
| Comparative Example 1 | —[1] | 49.2 | 95.9 |
| Comparative Example 2 | Comparative Compound 1[2] | 44.1 | 99.4 |
| Comparative Example 3 | Comparative Compound 2[3] | 73.4 | 107.1 |
| Comparative Example 4 | Comparative Compound 3[4] | 79.3 | 105.0 |

[1] Without blending of a crystalline nucleating agent
[2] Comparative Compound 1:

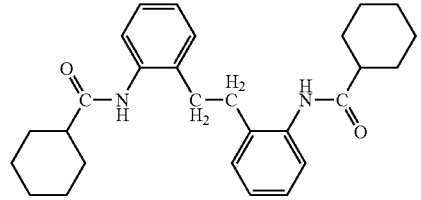 [SMILES: O=C(Nc1ccccc1CCc1ccccc1NC(=O)C1CCCCC1)C1CCCCC1]

[3] Comparative Compound 2:

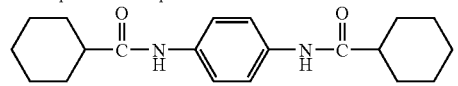

[4] Comparative Compound 3:

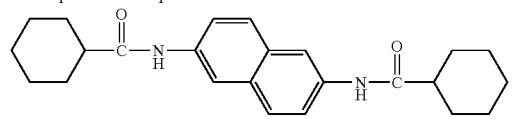

It was revealed, according to Table 1, that polyolefin resin compositions produced using compounds other than a methylenebisanilide compound of the present invention as the crystalline nucleating agent fail to satisfy both of transparency and the crystallization temperature, and Comparative Examples 3 and 4 revealed that they may make the transparency even worse. In contrast, polyolefin resin compositions produced using methylenebisanilide compounds of the present invention were shown to be excellent in transparency and the crystallization temperature by Examples 1 to 10.

The invention claimed is:

1. A polyolefin resin composition comprising 0.01 to 10 parts by mass of a methylenebisanilide compound with respect to 100 parts by mass of a polyolefin resin, which methylenebisanilide compound is represented by the following General Formula (1):

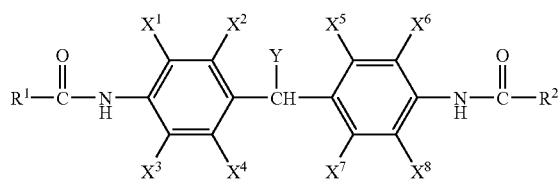

wherein, in said General Formula (1), each of $R^1$ and $R^2$ represents cyclohexyl; each of $X^1$, $X^3$, $X^6$ and $X^8$ represents ethyl; and each of $X^2$, $X^4$, $X^5$ and $X^7$ represents a hydrogen atom; and Y represents a hydrogen atom, $C_1$-$C_4$ alkyl which is optionally substituted or branched, $C_3$-$C_{12}$ cycloalkyl which is optionally substituted, or $C_6$-$C_{20}$ aryl which is optionally substituted.

2. A polyolefin resin composition comprising 0.01 to 10 parts by mass of a methylenebisanilide compound with respect to 100 parts by mass of a polyolefin resin, which methylenebisanilide compound is represented by the following General Formula (1):

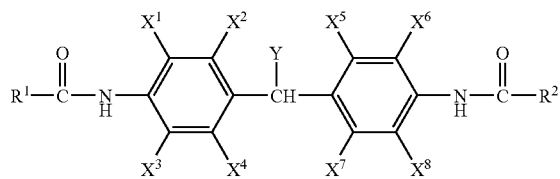

wherein, in said General Formula (1), each of $R^1$ and $R^2$ represents $C_1$-$C_4$ alkyl which is optionally substituted or branched; each of $X^1$, $X^3$, $X^6$ and $X^8$ represents ethyl; and each of $X^2$, $X^4$, $X^5$ and $X^7$ represents a hydrogen atom; and Y represents a hydrogen atom, $C_1$-$C_4$ alkyl which is optionally substituted or branched, $C_3$-$C_{12}$ cycloalkyl which is optionally substituted, or $C_6$-$C_{20}$ aryl which is optionally substituted.

3. The polyolefin resin composition according to claim 2, wherein, in said General Formula (1), each of $R^1$ and $R^2$ represents isopropyl or isobutyl.

4. A polyolefin resin composition comprising 0.01 to 10 parts by mass of a methylenebisanilide compound with respect to 100 parts by mass of a polyolefin resin, which methylenebisanilide compound is represented by the following General Formula (1):

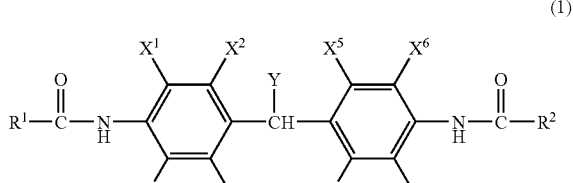

wherein each of $R^1$ and $R^2$ represents cyclohexyl; each of $X^1$, $X^3$, $X^6$ and $X^8$ represents methyl; and each of $X^2$, $X^4$, $X^5$ and $X^7$ represents a hydrogen atom; and Y represents a hydrogen atom, $C_1$-$C_4$ alkyl which is optionally substituted or branched, $C_3$-$C_{12}$ cycloalkyl which is optionally substituted, or $C_6$-$C_{20}$ aryl which is optionally substituted.

5. The polyolefin resin composition according to claim 2, wherein each of $R^1$ and $R^2$ represents butyl.

* * * * *